United States Patent [19]

Davis

[11] 4,191,305

[45] Mar. 4, 1980

[54] CONTAINER HAVING BLOWN PLASTIC LINER AND METHOD AND APPARATUS FOR FORMING SAME

[75] Inventor: Glenn L. Davis, Chicago, Ill.

[73] Assignee: The Continental Group, Inc., New York, N.Y.

[21] Appl. No.: 918,301

[22] Filed: Jun. 22, 1978

Related U.S. Application Data

[62] Division of Ser. No. 794,993, May 9, 1977, Pat. No. 4,127,430.

[51] Int. Cl.$^2$ ............................................. B65D 25/14
[52] U.S. Cl. ..................................... 220/462; 229/4.5; 220/461
[58] Field of Search ........................ 220/462, 461, 453; 229/4.5; 156/244.14, 287; 264/89, 90, 98, 269

[56] References Cited

U.S. PATENT DOCUMENTS

| | | | |
|---|---|---|---|
| 2,727,673 | 12/1955 | Bergstrom | 220/452 |
| 2,804,995 | 9/1957 | Fee | 220/461 |
| 3,158,311 | 11/1964 | Thompson | 220/452 |
| 3,357,626 | 12/1967 | Carpenter et al. | 220/461 |
| 3,445,049 | 5/1969 | Carpenter, Jr. | 220/461 |
| 3,606,958 | 9/1971 | Coffman | 220/461 |

*Primary Examiner*—Joseph Man-Fu Moy
*Attorney, Agent, or Firm*—Charles E. Brown

[57] ABSTRACT

This relates to a lined container, preferably of the fibre drum type, wherein the lining is extruded as an open ended tube and is initially adhered to the bottom or end wall of the container to seal the tube after which the tube is first inflated and blown across the end wall and is then blown within the container so as to conform to the interior configuration of the container body. The tube is formed by an extruder, and/or accumulator capable of intermittent extrusion with therebeing relative movement between a die associated with the extruder and the container during the extrusion of the tube, and after the entire interior of the container has been lined, there is associated with the die and the container a mold which upon further extrusion of the tube and the blowing of air within the tube the tube either may be caused to fold around the exterior free end portion of the container so as to form therearound or may be shaped to define a flange which is later draped around the container free end portion. In the case of a fibre drum, the formed or draped portion of the liner protects the metal reinforcing ring in the chime area against corrosion.

1 Claim, 9 Drawing Figures

U.S. Patent  Mar. 4, 1980  Sheet 1 of 2  4,191,305
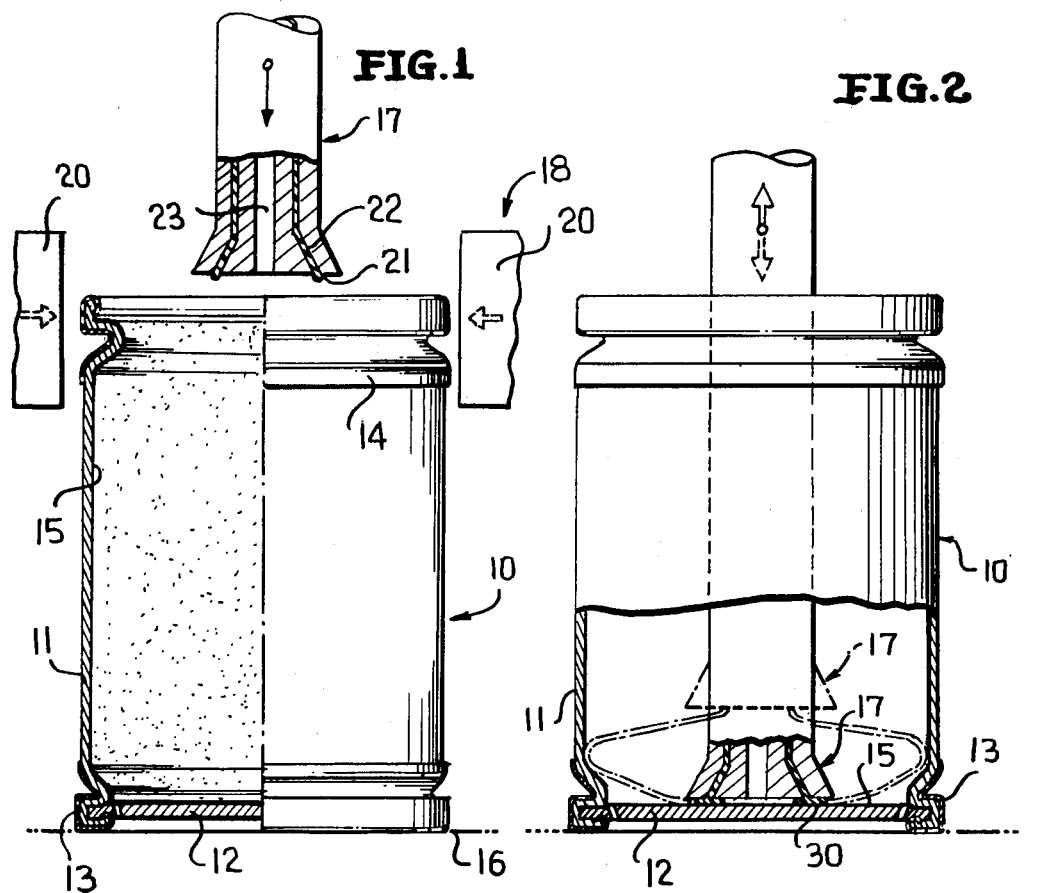
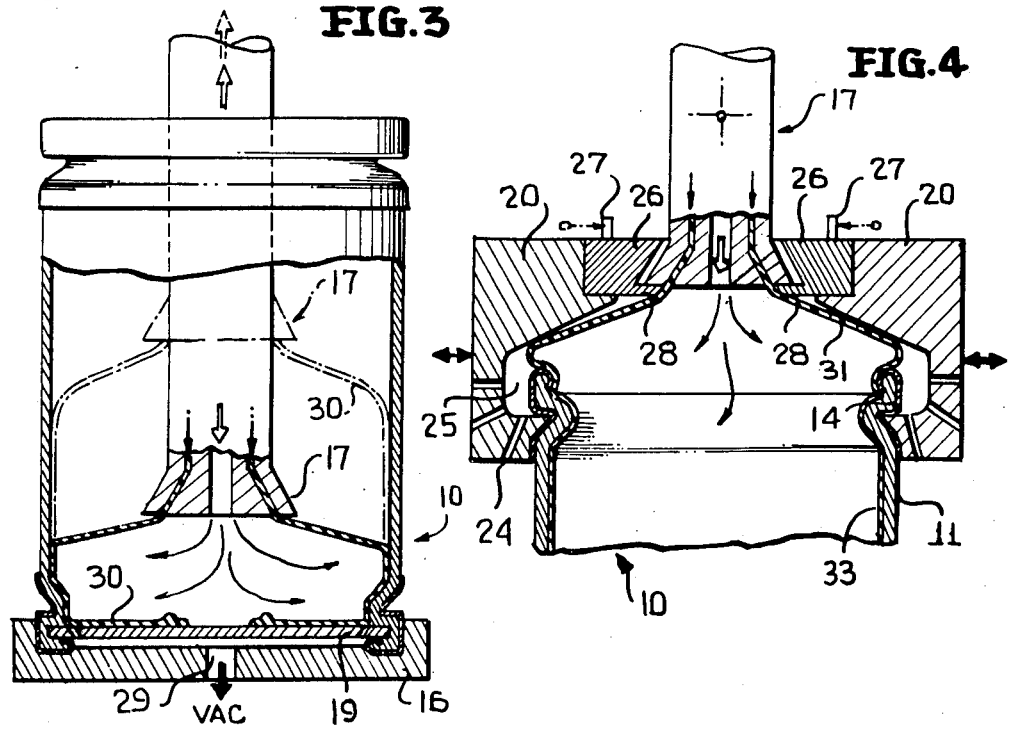

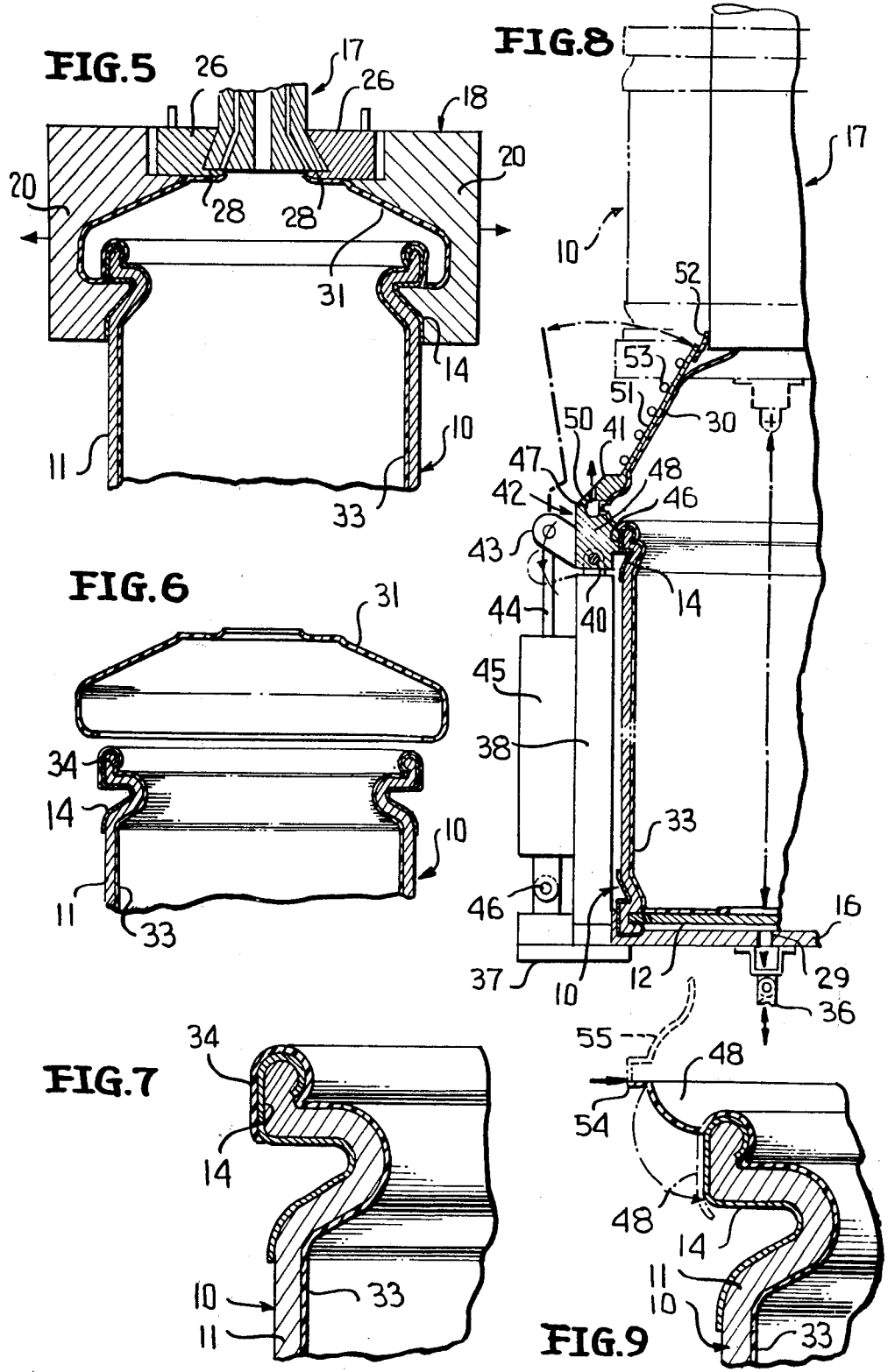

CONTAINER HAVING BLOWN PLASTIC LINER AND METHOD AND APPARATUS FOR FORMING SAME

This is a division of application Ser. No. 794,993 filed May 9, 1977, now U.S. Pat. No. 4,127,430.

This invention relates in general to new and useful improvements in lined containers, and more particularly to a container having formed therein a plastic lining which is applied in the form of an open tube and is then simultaneously extruded and blown within the container so as to conform to the configuration of the container. The lining is particularly adaptable for use in conjunction with fibre drums.

It is known to provide plastic liners for containers. Typical of prior modes of forming such liners is the formation of a bubble, positioning the bubble within the container, and blow molding the same to the configuration of the container. Other modes include the preforming of a lining on a core pin and then blow molding the preform in the container. Typical of such prior art are the U.S. Patents to Strong U.S. Pat. No. (2,898,972); Makowski No. (3,091,000); Meissner No. (3,169,086) and Fuller No. (3,816,578).

In accordance with this invention, the extrusion from which the liner is formed is open-ended and does not require a tube or parison which has been molded with a closed end or is pinched off.

In accordance with the invention, the leading or free edge of an open-ended extrusion is adhered to the inside bottom surface of a container to form the seal necessary for blowing the extrusion under gaseous pressure. In order to effect the required seal, the bottom surface must be especially prepared, as by coating, to effect or promote adhesion, and insure liquid or vapor containment.

In accordance with the invention, it is also feasible to especially prepare, as by coating, the interior surface of the body of the container to also effect or promote adhesion, and as required to meet specifications.

In order to form a seal with a closure, it is desirable that the extrusion be folded over the upper free end of the container body; this may be accomplished during the molding process or as a subsequent operation. When the container is a fibre drum and the upper chime is defined by a metal ring, it is desirable that the liner fold down over the upper chime to protect the same against corrosion. In order to effect this folding, there is provided a mold which is associated with the upper portion of the container and the extrusion head after the interior of the container has been lined and the extrusion is blow molded within the mold either down around the upper chime of the container or as a flange in the mold for later folding or draping around the upper chime.

With the above, and other objects in view that will hereinafter appear, the nature of the invention will be more clearly understood by reference to the following detailed description, the appended claims and the several views illustrated in the accompanying drawings.

IN THE DRAWINGS

FIG. 1 is a schematic elevational view showing a conventional container positioned relative to a mold and an extrusion head preparatory to the application of a lining in accordance with this invention, the container being partially broken away and shown in section.

FIG. 2 is an elevational view similar to FIG. 1 and shows the extrusion head in telescoped relation with respect to the container and initially applying a tubular extrusion to the bottom or end wall of the container, a latter blown bubble being shown in phantom lines.

FIG. 3 is an elevational view similar to FIG. 2 and shows the extrusion blown across the end wall and in the process of being blow molded to the internal configuration of the container body.

FIG. 4 is a schematic sectional view through the container, the blow mold and the extrusion head with the lining substantially completely applied to the interior of the container.

FIG. 5 is a sectional view similar to FIG. 4 and shows the extrusion blow molded within the mold so as to fold and drape around the exterior of the upper portion or chime of the container and with the extrusion severed from the extrusion head.

FIG. 6 is a schematic sectional view of the upper portion of the lined container with a waste portion of the extrusion severed therefrom.

FIG. 7 is an enlarged fragmentary vertical sectional view through an upper portion of the lined container and shows specifically the lining molded about the exterior of the container.

FIG. 8 is a schematic elevational view similar to FIG. 1 of a modified mold arrangement for forming a liner flange to be later draped over the chime and illustrates that in lieu of the extrusion die moving down into the fixed container, as shown in FIGS. 1-3, the extrusion head may be fixed and the container and mold moved up into telescoped relation with respect to the extrusion head.

FIG. 9 is a sectional view similar to FIG. 7 but shows the modified liner of FIG. 8 and its relation to the container both before and after folding thereof into its chime protecting position.

Referring now to the drawings in detail, it will be seen that there is illustrated in FIG. 1 a typical container which will be lined in accordance with this invention with a lining formed of plastics material. The container is generally identified by the numeral 10 and the illustrated container is a fibre drum. The container 10 includes a body 11 which is closed at its lower end by an end wall 12 which will normally be the bottom wall of the container. The end wall 12 may be separately formed or may be integral with the body 11. In the case of a fibre drum, the lower portion of the body 11 will have a metal reinforcing ring 13 with this ring defining a lower chime of the container.

It is also pointed out here that when the container is in the form of a fibre drum, the upper end of the container will also be reinforced by a metal ring 14 which will define the upper chime of the container, the metal ring 14 serving both to reinforce the body 11 and to provide a proper seating surface for a closure (not shown) which is to be applied to the container.

In FIG. 1 the container 10 is illustrated as having an internal coating 15 which extends over the entire interior thereof. While it is preferred to apply the coating 15 to the entire interior of the container, it is to be understood that the coating could be restricted to a radially outer annular portion of the inner surface of the end wall 12. The purpose of the coating 15 is to assure adhesion of the plastics material extrusion which is to be extruded by the extrusion heads.

In the illustrated form of the invention shown in FIGS. 1-5, the container 10 is fixedly mounted on a suitable combined centering and supporting device 16 and the extrusion head, generally identified by the numeral 17, is mounted for vertical reciprocation between a position elevated above the container, as shown in FIG. 1, to a position fully telescoped within the container, as shown in FIG. 2. The extrusion head includes a conventional die for extruding a tube and is suitably connected to a conventional extruder or accumulator for the intermittent extrusion of a tube of plastics material. An associated blow mold, generally identified by the numeral 18, is vertically fixed and is formed of identical sections 20 which may either be separable in a horizontal plane, as shown in FIG. 4, or may be mounted for pivotal movement in a clam-shell manner as shown in FIG. 8, to have selectively received within the blow mold 18 the upper portion of the container 10.

The die portion of the extrusion head 17 is provided with an annular extrusion orifice 21 which receives plastics material on a controlled and intermittent basis from the accumulator or extruder through a passage 22.

In order to effect the blow molding of an extruded plastics material tube extruded by the extrusion head 21 within the container 10, the extrusion head 17 is also provided with a centrally located passage 23 for a gas, normally air, under pressure. The passage 23 opens through the lower end of the extrusion head 17 within the confines of the orifice 21. At this time it is pointed out that the end wall 12 preferably has a peripheral arrangement of apertures 19 and that the device 16 has a vacuum passage 29 formed therethrough for drawing a vacuum within the container.

Referring now to FIG. 4 in particular, it will be seen that the blow mold 18 is of a configuration so as to clamp the exterior of the container body 11 below the chime 14, as at 24. In the area of the chime 14, the configuration of the blow mold 18 is such so as to leave a space around the chime 14 which will permit the forming of the extruded plastics material down around the chime 14. This space is generally identified by the numeral 25. The space 25 is either suitably vented to the atmosphere or connected to a vacuum source.

The upper portion of the blow mold 18 may be provided with a split insert 26 positioned for forming a seal at least with the underside of the extrusion head 17 and with portions of the split insert 26 having actuating elements 27 to effect the movement of portions of the split insert relative to the extrusion head 17 to effect a shearing of the extrusion below the underside of the extrusion head 17. To this end, portions of the insert 26 are in the form of cutters 28. Other methods of severing the parison, well known in the art of plastics material processing, may be utilized eliminating the need for the inserts 26 and the cutters 28.

OPERATION

As is shown in FIG. 1, the container 10 to be lined is properly positioned with respect to the extrusion head 17 and the blow mold 18. The extrusion head 17 is then moved down into the container 10 until the underside of the extrusion head 17 substantially engages the inner surface of the end wall 12. At this time extrusion of plastics material in tubular form is initiated with the resultant extrusion, identified by the numeral 30, being in pressure contact with the coating 15 on the inner surface of the end wall 12 so as to form a seal between the extrusion 30 and the container.

After the extrusion 30 has adhered to the end wall 12, gas (air) under pressure is directed through the passage 23 and the extrusion head 17 is lifted slightly while more of the extrusion 30 is extruded. The net result is that the extrusion 30 is blown as a bubble across the inner surface of the end wall 12 and into engagement with the interior surface of the body 11, as is shown in phantom lines in FIG. 3.

At the same time the vacuum drawn through the apertures 19 in the end wall assists in the shaping of the bubble to match the lower portion of the container interior. Then as the extrusion of the plastics material continues together with the continued introduction of the gas under pressure, the extrusion head 17 is elevated with the extruded tube conforming to the interior configuration of the body 11. This process continues until the extrusion head reaches a position near the top of the container 10 at which time the introduction of the gas under pressure and the extrusion of the plastics material may be temporarily discontinued.

The mold 18 is then closed, as shown in FIG. 4. After the mold 18 is closed, the extrusion of the plastics material may continue together with the introduction of further gas under pressure with the result that that portion of the extruded tube between the upper part of the interior of the body 11 and the extrusion head 17 is forced downwardly and outwardly in an open folded condition into the mold space 25 and around the chime 14 to a position as shown in FIG. 5. At this time the lining of the container 10 is completed and the extrusion of the plastics material and the introduction of the gas under pressure is discontinued. Then the split portions of the inserts 26 are actuated so as to sever the extruded tube 30 from the plastics material within the extrusion head 17 as is specifically shown in FIG. 5, or the extrusion is otherwise broken or separated from the die.

Following the completion of the liner, the mold 18 is vented and opened and the lined container is removed. Thereafter, the excess lining material, identified by the numeral 31, is trimmed from the container and is discarded as waste.

It will be readily apparent that the extrusion head 17 is now ready to form another lining within a next container and the mold 18 is open for the reception of a next container.

In the embodiment of the invention illustrated in FIGS. 1 through 5, the container 10 is mounted on a fixed support 16 and the extrusion head 17 is vertically movable. On the other hand, it is to be understood that the extrusion head 17 may be vertically fixed and the supporting device 16 is vertically movable. The mold 17 either may be fixed or moved with the device 16. It is to be understood that the operation of such apparatus will be the same, the only difference being that the container is moved relative to the extrusion head as opposed to the extrusion head being movable relative to the container.

Referring now to FIG. 7, it will be seen that not only is the interior of the container 10 fully lined with a lining 33, but also that lining is draped or molded over the exterior of the body 11 at the upper end thereof, as at 34, and covers the chime 14. The lining 33 exteriorly of the body 11 completely encases the desired part of the chime 14 so as to protect the same against corrosion. In addition, the lining 33 overlies the extreme end of the body 11 so as to form between the body 11 and a closure (not shown) a seal.

It is to be understood that when the plastics material of the lining 33 cools, it will have a tendency to conform exactly to the configuration of the interior of the container 10. However, if the entire interior of the container 10 is precoated with the coating 15, there will be an adherence of the lining 33 to the entire interior of the container 10.

Reference is now made to FIG. 10 wherein the extrusion head 17 is fixed and the supporting device 16 is mounted for vertical reciprocation by means of a lift device 36. Associated with the supporting device 16 is a frame 37 which may either be fixed so as to determine the lowermost position of the supporting device 16 or which may be fixedly connected to the supporting device 16 for movement therewith. The frame 37 has a plurality of upstanding supports 38 carried thereby in circumferentially spaced relation. Pivotally mounted as at 40 on the supports 38 are sections 41 of a split mold, generally identified by the numeral 42. The mold 42 has the sections 41 thereof opening in a clam-shell like manner, and each mold section 41 is provided with a lever 43 which, in turn, is connected to an upper end of a piston rod 44 of a fluid motor 45. The lower part of the fluid motor 45 is pivotally mounted on the frame 37 as at 46.

It is to be understood that there is a plurality of the fluid motors 45 and that suitable conventional control means will be provided for simultaneously actuating all the fluid motors 45 so as to simultaneously open or close the mold 42.

The mold 42 is of a configuration so as to contact the chime 14 of the container 10 about the exterior thereof in sealed relation as at 46. The mold 42 extends upwardly above the container 10 when the container 10 is seated therein so as to define a cavity 47. The cavity 47 is particularly configured to mold a flange 48 from the extrusion 30 as an upward and outward continuation of the lining 33 which is applied to the container 10 in the manner set forth above with respect to the embodiment shown in FIGS. 1 through 5.

In order to assist the forming of the extrusion 30 to define the flange 48, the cavity 47 is in communication with an exhaust passage 50 which is connected to a suitable vacuum source.

The mold 42 has a conical extension 51 which extends up and is telescoped generally around the extrusion head 17. A gas tight seal is formed between the extension 51 and the extrusion head 17 by means of a sealing strip 52.

At this time it is pointed out that extension 51 is provided with cooling coils 53 so as to facilitate the cooling of the extrusion 30 when the extrusion 30 contacts the extension 51.

OPERATION

With the mold 42 open, the container 10 is moved upwardly until the end wall 12 thereof is contacting the extrusion 30 projecting from the underside of the extrusion head 17, after which the lining 33 is applied in the same manner applied and illustrated with respect to FIGS. 1-5 except that the container is gradually moved downwardly during the lining thereof while extrusion head 17 remains fixed.

After the interior of the container 10 has been lined and the liner 33 completely formed, extrusion of the plastics material continues together with the maintaining of gaseous pressure within the extrusion 30. As a result of the gaseous pressure internally of the extrusion 30 and the suction applied in the suction passage 50, the extrusion 30 is drawn into the cavity 47 and the flange 48 is formed.

After the flange 48 has been formed, the extrusion above the flange is rapidly cooled by its contact with the extension 51. Thus when the mold 42 is opened, the extrusion 30 may be readily broken from the extrusion head 17.

Referring now to FIG. 9, it will be seen that after the lined container 10 has been removed from the mold 42, the extrusion 30 above the flange 48 may be trimmed as at 54 with the extrusion 30 above the flange 48 constituting waste 55 which is discarded and reused. Thereafter the flange 48 may be moved down around the upper part of the chime 14, as shown in phantom lines in FIG. 9, to protect the chime 14.

A comparison of the lined containers of FIGS. 7 and 9 will show that the resulting containers are substantially identical and that they differ primarily in whether the chime 14 is covered by plastics material which is molded in place in the case of the container of FIG. 7 or which is folded in place in the case of the container of FIG. 9.

Although only preferred embodiments of the invention have been specifically illustrated and described herein, it is to be understood that minor variations may be made in the apparatus and the methods of utilizing the same without departing from the spirit and scope of the invention, as defined by the appended claims.

I claim:

1. A lined container, said lined container comprising a container including an end wall and a body, and a tubular lining, said lining being bonded to said end wall about a preselected exposed area of said end wall and extending across said end wall in stretched relation to said body, and said liner is in an expanded state above said end wall and confirming to said body, said lining having a terminal annular end portion forming that part of said lining bonded to said container end wall about said preselected exposed area of said end wall.

* * * * *